United States Patent [19]

Guthrie et al.

[11] 4,103,557

[45] Aug. 1, 1978

[54] TOOL APPARATUS FOR MOUNTING ON A HOUSING

[76] Inventors: Richard E. Guthrie, 524 S. 7th St.; Ronald L. Allenbach, 516 S. 8th St., both of Kiowa, Kans. 67070

[21] Appl. No.: 767,360

[22] Filed: Feb. 10, 1977

Related U.S. Application Data

[63] Continuation of Ser. No. 628,583, Nov. 4, 1975, abandoned.

[51] Int. Cl.[2] .............................................. F16H 21/44
[52] U.S. Cl. ...................................................... 74/102
[58] Field of Search .................................. 74/102, 103

[56] References Cited

U.S. PATENT DOCUMENTS

| | | | |
|---|---|---|---|
| 2,516,501 | 7/1950 | Altman et al. | 74/103 |
| 2,650,608 | 9/1953 | Nystul | 137/560 |
| 2,800,798 | 7/1957 | Korsmo | 74/102 |
| 2,911,837 | 11/1959 | Gannett et al. | 74/103 |
| 3,004,458 | 10/1961 | Dvorak | 74/102 |
| 3,604,454 | 9/1971 | Tomko et al. | 74/102 |

*Primary Examiner*—Benjamin W. Wyche
*Assistant Examiner*—Wesley S. Ratliff, Jr.
*Attorney, Agent, or Firm*—John H. Widdowson; Edwin H. Crabtree

[57] ABSTRACT

A tool apparatus for urging a pair of slidably mounted plungers into a housing. The tool apparatus mounted on the housing and disposed adjacent the ends of the outwardly extending plungers mounted in the housing.

4 Claims, 5 Drawing Figures

TOOL APPARATUS FOR MOUNTING ON A HOUSING

This is a continuation of application, Ser. No. 628,583, filed Nov. 4, 1975 now abandoned.

BACKGROUND OF THE INVENTION

This invention relates generally to hydraulic systems and more particularly, but not by way of limitation, to an apparatus for releasing hydraulic hoses from the hydraulic system.

Heretofore various types of vehicles used in the farming industry, construction industry, etc., the hydraulic systems having a closed or open center circuit hydraulic system for supplying hydraulic power to a towed equipment. These hydraulic systems include a breakway coupler housing which allows the hydraulic hoses of the towed equipment to be quickly removed from the towing vehicle.

Should the towed equipment come loose from the towing vehicle the hydraulic hosing is released from the breakway coupler housing thereby preventing the breakage of the hydraulic hoses. Also if the hydraulic hoses are released while the hydraulic system is in operation and under pressure the breakway coupler housing provides valve means for stopping the supply of hydraulic fluid to the hydraulic cylinders of the towed equipment.

When it is desired to remove the hydraulic hoses from the breakaway coupler housing, the hoses are removed by hand or using tools such as pliers, wrenches, or pry bars.

Some breakaway systems include a slidably mounted release plunger positioned at the rear of the housing which can be used to release the hydraulic hoses from the housing. Often the space between the vehicle frame and the breakaway coupler housing is limited and the plunger is difficult to reach by hand or insert a tool against to release the hose.

Also it is often desired to release the hydraulic hoses when the hydraulic system is under pressure so that the hydraulic cylinders of the towed equipment remain in a fixed position. When the breakaway coupler housing is under pressure it is additionally more difficult to release the plunger by hand or apply a tool against the end of the plunger.

Prior to the subject invention there has not been an apparatus for attaching to the breakaway coupler housing to aid the vehicle operator in quickly releasing the hydraulic hoses from the breakaway coupler housing.

SUMMARY OF THE INVENTION

The subject invention provides a safe, yet effective means for coacting with the release plunger of the breakaway coupler housing in releasing the attached hydraulic hoses.

The quick release apparatus is easy to use and is readily adaptable for mounting to existing breakaway coupler housings.

This invention eliminates the need of removing the hydraulic hoses by hand or with tools and prevents the possible danger of working on the hydraulic hoses while they are under hydraulic pressure.

The hydraulic hose quick release apparatus includes a lever mount having a flange portion attached to the breakaway coupler housing. A pair of levers are rotatably attached to the lever mount. The levers have an edge portion disposed adjacent the slidably mounted release plunger so that the levers can individually contact the ends of the release plungers and urge the plungers inwardly into the breakaway coupler housing thereby releasing the hydraulic hose from the housing.

The advantages and object of the invention will become evident from the following detailed description when read in conjunction with the accompanying drawings which illustrate the preferred embodiments of the invention.

DETAILED DESCRIPTION OF THE DRAWINGS

Figure 1:
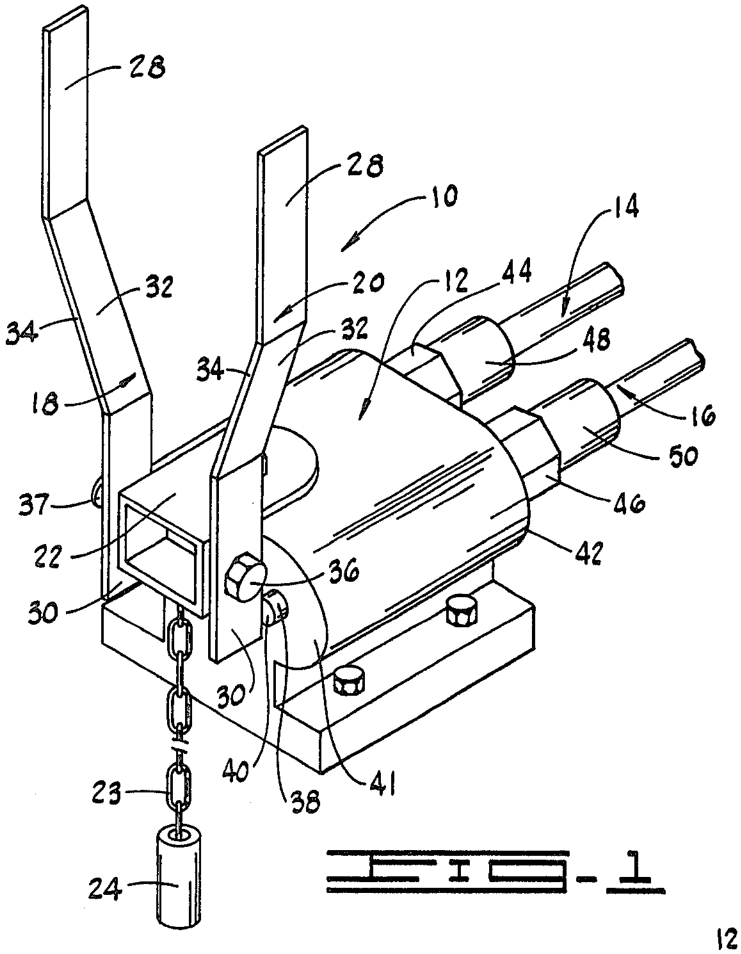
FIG. 1 is a perspective view of the hydraulic hose quick release apparatus attached to the breakaway coupler housing.

In FIG. 1 the hydraulic hose quick release apparatus is designated by general reference number 10. The apparatus 10 is attached to a hydraulic breakaway coupler housing 12 having hydraulic hoses 14 and 16 attached thereto.

The hydraulic quick release apparatus 10 includes a first lever 18, a second lever 20 and a lever mount 22. Suspended from the lever mount 22 by a chain 23 is a lock release member 24. The levers 18 and 20 include a first end 28, a second end 30, sides 32, and edges 34 therearound. The levers 18 and 20 are rotatably attached to the lever mount 22 by a bolt 36 and nut 37.

Figure 3:
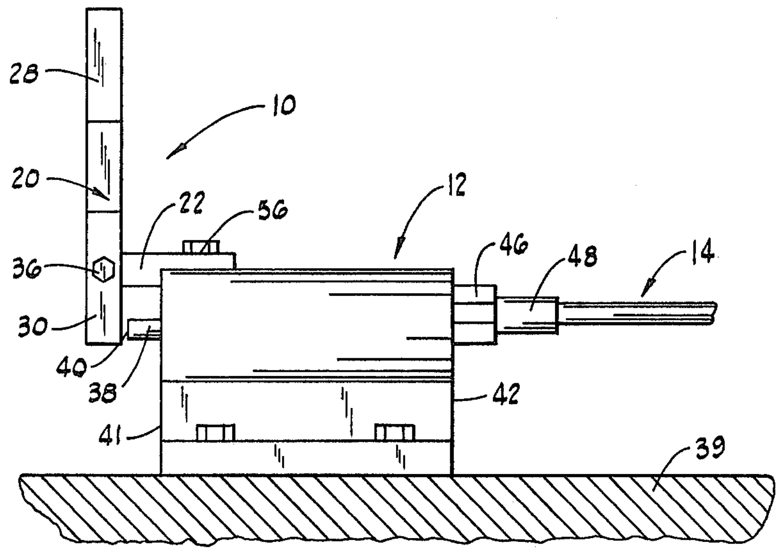
FIG. 3 is a side view of hydraulic hose quick release apparatus attached to the breakaway coupler housing shown in FIG. 1.

The breakaway coupler housing 12 is attached to a portion 39 of the vehicle's frame shown in FIG. 3. The housing 12 is interconnected with the vehicle's closed or open center circuit hydraulic system which is not shown. The housing 12 includes a pair of release plungers 38 which are slidably mounted in the housing 12 and having an end portion 40 extending outwardly from a rear portion 41 of the housing 12. In this view the second plunger 38 is hidden behind the lever mount 22. Extending from a front side 42 of the breakaway coupler housing 12 are breakaway coupler plugs 44 and 46. One end of the plugs 44 and 46 is inserted into the housing 12. The other end of the plugs 44 and 46 is threaded onto metal ends 48 and 50. The metal ends 48 and 50 are pressed onto the hoses 14 and 16.

Figure 2:
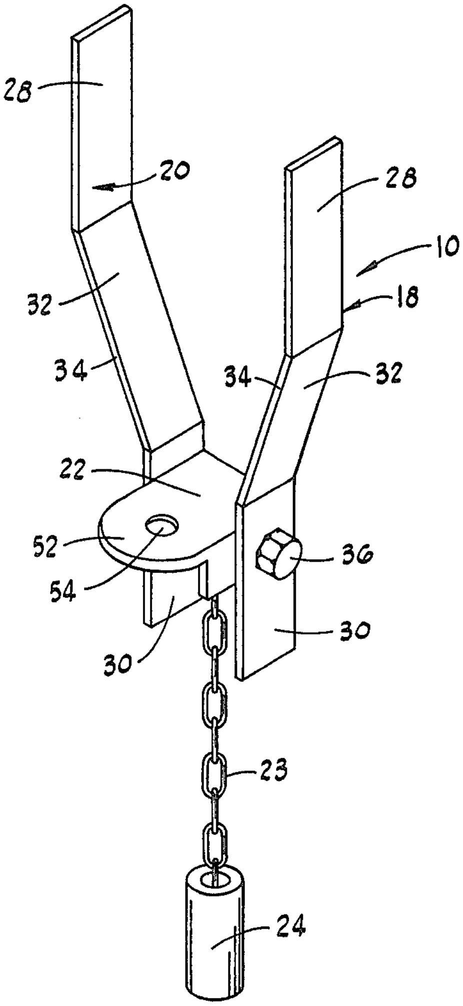
FIG. 2 is a perspective view of the hydraulic hose quick release apparatus.

In FIG. 2 the apparatus 10 is shown disconnected from the breakaway coupler housing 12. The lever mount 22 is seen with a flange portion 52 having an aperture 54 therethrough for receiving a bolt 56 shown in FIG. 3 for attaching the apparatus 10 to the breakaway coupler housing 12. In this view the levers 18 and 20 are shown positioned parallel to each other. The levers 18 and 20 from the lever mount 22 upward are flared outwardly from each other to avoid hitting against hardware mounted on or attached to the vehicle.

FIG. 3 is a side view of the apparatus 10 shown in FIG. 1 and mounted to the breakaway coupler housing 22. In this view the coupler housing 12 can be seen mounted on top of the portion 39 of the vehicle frame.

It should be noted that the levers 18 and 20 shown in FIGS. 1 and 2 and lever 20 shown in FIG. 3 are attached to the lever mount 22 between the first end 28 and the second end 30 of the levers. Therefore, when the levers 18 and 20 are rotated on the lever mount 22 the edge 34 of the second end 30 which is disposed adjacent the plungers 38 contacts the end portion 40 for urging the plungers 38 into the interior of the coupler housing 12 which in turn releases the breakaway coupler plugs 44 and 46 from the coupler housing 12.

Figure 4:
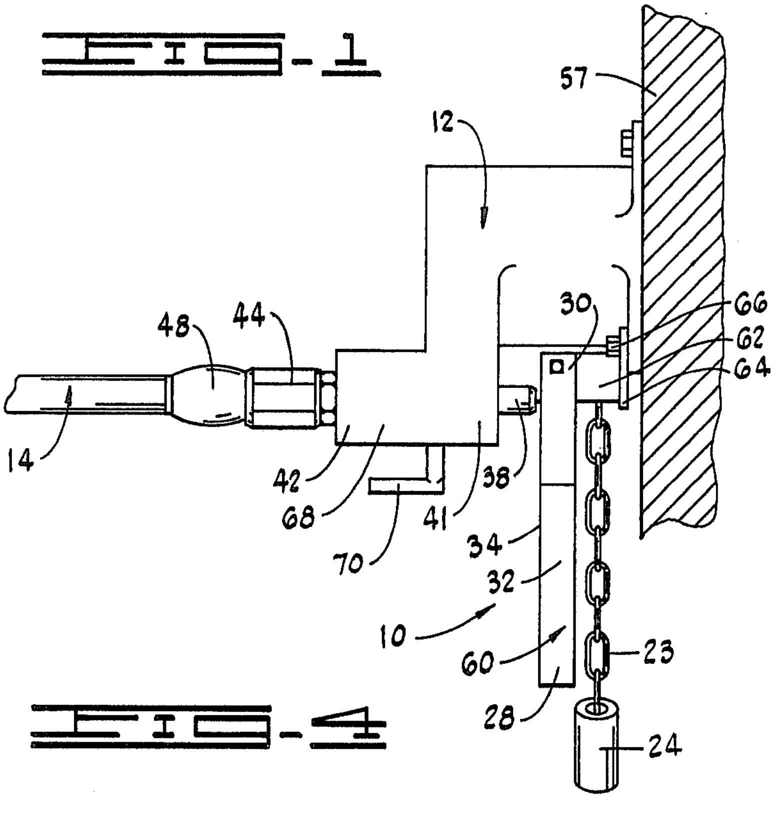
FIG. 4 is an alternate embodiment of the hydraulic hose quick release apparatus attached to a side mounted hydraulic breakaway coupler housing.
Figure 5:
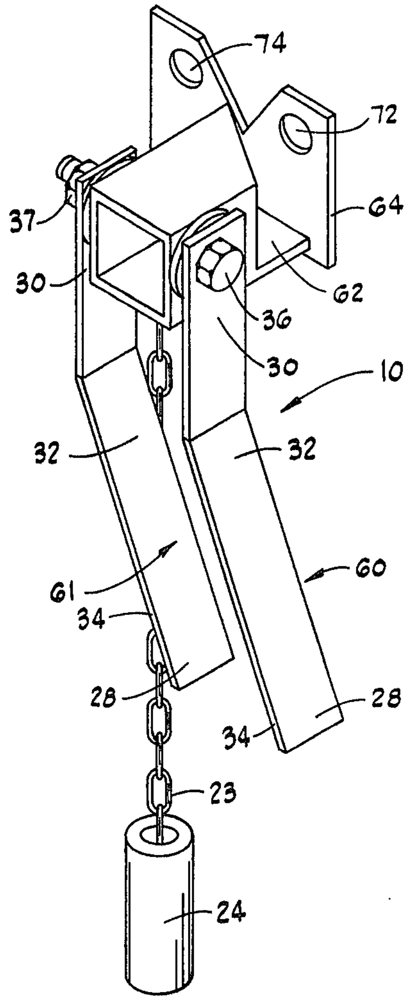
FIG. 5 is a perspective view of the alternate embodiment of the hydraulic hose quick release apparatus.

FIG. 4 shows an alternate embodiment of the apparatus 12 attached to the breakaway coupler housing 12. In this view the coupler housing 12 is a side mounted housing attached to a side portion 57 of the vehicle's frame. A lever 60 and a lever 61 shown in FIG. 5 are mounted in a downward position rather than an upward position as shown in FIGS. 1, 2 and 3. The second end 30 of the lever 60 is rotatably mounted to a lever mount 62. In this embodiment the lever 60 is gripped at the first end 28 and rotated about the second end 30 and an edge 34 between the first end 28 and second end 30 contacts the plunger 38. The lever mount 62 includes a flange portion 64 which is bolted to the frame 57 by a pair of bolts 66. Attached to a bottom portion 68 of the coupler housing 12 is lock release lever 70 for holding the hydraulic hose 14 in place when the breakaway coupler plug 44 is inserted into the coupler housing 12. The lock release member 24 is provided as a tool for the operator to turn the lock release lever 70 when it is required to insert the plug 44 into the housing 12.

FIG. 5 is a perspective view of the alternate embodiment of the apparatus 10 shown in FIG. 4 and disconnected from the side mounted coupler housing 12. In this view the flange portion 64 of the lever mount 62 can be seen having apertures 72 and 74 therethrough for receiving the bolts 66 for attaching to the frame 57. In this view the levers 60 and 61 are shown positioned parallel to each other with the lower portion of the levers offset at an angle to take advantage of avoiding the levers hitting hardware which is mounted on or attached to the vehicle.

While the drawings have shown two different embodiments of the levers of the apparatus 10 having different designs it should be understood additional arrangements and designs of the levers could be used to avoid hitting against any hardware attached to or mounted on the vehicle and still accomplish the purpose of having an edge portion 34 of the levers contact the end portion 40 of the plunger 38 so that the levers could be rotated toward the housing 12 and urging the release plunger 38 into housing 12 so that the hydraulic hoses 14 and 16 can be released.

Changes may be made in the construction and arrangement of the parts or elements of the embodiments as disclosed herein without departing from the spirit or scope of the invention as defined in the following claims.

I claim:

1. A tool apparatus for urging a pair of slidably mounted plungers inwardly into a housing, the apparatus comprising:

a hollow angular shaped lever mount having a top portion, a bottom portion, side portions, and a hollow center portion, said lever mount having an outwardly extending flange portion integrally formed in the top portion of said lever mount, the flange portion having an aperture therein for receiving a bolt therethrough and securing the lever mount to the housing; and a pair of levers having a first end, a second end, sides, and an edge therearound, a portion of the sides of said levers disposed against the side portions of said lever mount, the sides of said levers and the side portions of said lever mounts having apertures in said levers indexed with the apertures in the side portions of said lever mount for receiving a bolt therethrough and rotatably mounting said levers to said lever mount.

2. The apparatus as described in claim 1, wherein the sides of the first end of said levers include the apertures therein for receiving the bolt therethrough and rotatably attaching said levers to said lever mount.

3. A tool apparatus for urging a pair of slidably mounted plungers inwardly into a housing, the apparatus comprising:

a hollow angular shaped lever mount having a top portion, a bottom portion, side portions, and a hollow center portion, said lever mount having a vertically mounted flange portion attached to one end of said lever mount, the flange portion having a pair of apertures therein for receiving bolts therethrough and securing the lever mount to the housing; and a pair of levers having a first end, a second end, sides and an edge therearound, a portion of the sides of said levers disposed against the side portions of the other end of said lever mount, the sides of said levers and the side portions of said lever mount having apertures therein for receiving a bolt therethrough and rotatably mounting said levers to said lever mount.

4. The apparatus as described in claim 3, wherein the sides of the first end of said levers include the apertures therein for receiving the bolt therethrough and rotatably attaching said levers to said lever mount.

* * * * *